United States Patent
Oki et al.

(10) Patent No.: US 12,235,204 B2
(45) Date of Patent: Feb. 25, 2025

(54) CORROSION AMOUNT ESTIMATION APPARATUS AND CORROSION AMOUNT ESTIMATION METHOD

(71) Applicant: Nippon Telegraph and Telephone Corporation, Tokyo (JP)

(72) Inventors: Shota Oki, Musashino (JP); Shingo Mineta, Musashino (JP); Mamoru Mizunuma, Musashino (JP); Masayuki Tsuda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 254 days.

(21) Appl. No.: 17/777,156

(22) PCT Filed: Nov. 19, 2019

(86) PCT No.: PCT/JP2019/045256
§ 371 (c)(1),
(2) Date: May 16, 2022

(87) PCT Pub. No.: WO2021/100117
PCT Pub. Date: May 27, 2021

(65) Prior Publication Data
US 2022/0390354 A1    Dec. 8, 2022

(51) Int. Cl.
*G01N 17/02*    (2006.01)
*G01N 17/00*    (2006.01)

(52) U.S. Cl.
CPC ........... *G01N 17/02* (2013.01); *G01N 17/006* (2013.01)

(58) Field of Classification Search
CPC ........................................................ G01N 17/02
USPC .............................................................. 73/86
See application file for complete search history.

(56) References Cited

U.S. PATENT DOCUMENTS

| | | | | |
|---|---|---|---|---|
| 5,344,781 A | * | 9/1994 | Kitchen | G01N 33/241 436/60 |
| 2015/0185133 A1 | * | 7/2015 | Murray | G01N 17/04 205/775.5 |

FOREIGN PATENT DOCUMENTS

| | | | | |
|---|---|---|---|---|
| CN | 105738274 A | * | 7/2016 | .......... G01N 17/006 |
| JP | 2011-75477 A | | 4/2011 | |

OTHER PUBLICATIONS

Hao et al. Machine translation of CN105738274A. Published Jul. 2016. Accessed Mar. 2024. (Year: 2016).*

(Continued)

*Primary Examiner* — Walter L Lindsay, Jr.
*Assistant Examiner* — Philip T Fadul
(74) *Attorney, Agent, or Firm* — Workman Nydegger

(57) ABSTRACT

A corrosion amount estimation apparatus that estimates the corrosion amount of a metal material buried in the ground, the apparatus including: a soil adjustment unit that dries the target soil; a water permeability measurement unit that measures the water permeability of the soil after supplying water to the dried soil; and a corrosion estimation unit that estimates the corrosion amount of the metal material when buried in the soil using the water permeability.

6 Claims, 5 Drawing Sheets

(56) References Cited

OTHER PUBLICATIONS

Yoki Asano et al., *Development of a Simple Method for Measuring Physical Properties of Soil and Preparation of Clop Culture Soils Exhibiting Different Water Permeability*, Journal of Japan Society of Technology Education, vol. 59, No. 3, 2017, pp. 229-235.
Ye Wan et al., *Corrosion Behaviors of Q235 Steel in Indoor Soil*, International Journal of Electrochemical Science, vol. 8, 2013, pp. 12531-12542.
Satomi Tsunoda et al., *Some Problems for Evaluating Soil Aggresivity*, Boshoku Gijutsu, vol. 36, No. 3, 1987, pp. 168-177.

* cited by examiner

CORROSION AMOUNT ESTIMATION APPARATUS AND CORROSION AMOUNT ESTIMATION METHOD

TECHNICAL FIELD

The present invention relates to a corrosion amount estimation apparatus and a corrosion amount estimation method for estimating the corrosion amount of a metal material buried in the ground.

BACKGROUND ART

The infrastructure facilities that support our daily lives have been constructed in large numbers and at a rapid pace over the past 20 years since the period of rapid economic growth, so it is said that more than half of all facilities will be 50 years old by 2030. Therefore, it is necessary to promote infrastructure management in consideration of safety and efficiency in order to cope with the ever-increasing number of failure of facilities.

In order to prevent the failure of these aging infrastructure facilities, maintenance and operation through periodic inspections are being carried out. However, visual inspection is effective only for overhead facilities that exist above ground, and it is difficult to inspect facilities that exist in areas that cannot be seen, such as underground. Therefore, for those facilities that are difficult or impossible to inspect, at present, there is no choice but to renew them uniformly after a certain number of years.

The shorter the number of years to be renewed, the more safety can be ensured by preventing failures, but the facilities cannot be used until the end of their useful life, so the cost of renewal increases and cost efficiency is lost. On the other hand, the longer the number of years to be renewed, the lower the cost of renewing the facilities, but the risk of overlooking the failure of facilities that exists in an environment with a fast deterioration rate makes it impossible to ensure safety. As described above, for facilities in non-inspectable areas, operation based on the age of the facilities, i.e., time-based maintenance, cannot achieve both safety and efficiency.

As an operation method that achieves both safety and efficiency in underground facilities where visual inspection is difficult, operation according to the deterioration state of the facilities, that is, condition-based maintenance can be mentioned. This is an operation that predicts and estimates the deterioration of facilities based on environmental information and other factors, and prioritizes the replacement of facilities that are deteriorating. If this operation method is realized, safety can be ensured by renewing objects that are deteriorating rapidly without missing any deterioration, and cost efficiency will be improved by using objects that are deteriorating slowly for a longer period of time.

The main cause of deterioration of metal materials buried in the ground is soil corrosion. In order to predict the deterioration of the underground facilities, it is necessary to evaluate how the corrosion of metal materials buried in the ground progresses. Corrosion of a metal material buried in the soil is said to progress basically on the basis of cathodic and anodic reactions, as in air and aqueous solutions (NPL 1).

CITATION LIST

Non Patent Literature

NPL 1: Y. Wan, L. Ding, X. Wang, Y, Li, H. Sun and Q. Wang, Int. j. Electrochem. Sci., Vol. 8, pp. pp. 12531-12542.

SUMMARY OF THE INVENTION

Technical Problem

There are several possible methods to evaluate how the corrosion of a metal material buried in the ground progresses. The first is a non-invasive method of conducting corrosion assessment on existing outdoor facilities. However, the more complex the shape of underground structures, the more difficult it becomes to evaluate them non-invasively, and the method is not applicable to all underground facilities.

The second is the exposure test method, in which the sample is buried in an outdoor environment and corrosion is evaluated. In this method, the shape, surface area, weight, and thickness of the sample to be buried can be specified in advance, and the progress of corrosion can be evaluated from the amount of change before and after the exposure test. However, the fatal drawback is that it takes a long time to evaluate the corrosion because corrosion needs to be performed until corrosion measurement becomes possible.

The third is a method of obtaining a corrosion rate from environmental factors that are highly correlated with corrosion, and estimating the corrosion amount from the corrosion estimation equation. If the environmental factors that contribute most to corrosion are identified based on the corrosion mechanism of the material, and if the relationship between the environmental factors and the corrosion rate is clarified, the corrosion amount can be estimated. The corrosion of a metal material buried in the ground is said to progress based on the oxidation reaction (anodic reaction) in which iron is eluted as ions and the reduction reaction (cathodic reaction) in which oxygen in the aqueous solution receives electrons. From this, it can be said that water and oxygen are the dominant factors that trigger the corrosion reaction. Therefore, in soil corrosion, if the soil particle size, which is an environmental factor that determines the state of water and oxygen in the soil, can be measured, the corrosion amount can be estimated. It is also expected that the corrosion amount can be estimated by measuring the water permeability of the soil, which correlates with the soil particle size.

The following two methods are widely used as the measurement of the soil particle size. The first is a soil grain size analysis method described in JIS A 1204: 2009. This test applies sieve analysis to particles of 75 μm or more and sedimentation analysis to particles of 75 μm or less. The test instruments are specified in JIS Z 8801-1 and relatively inexpensive. However, due to the huge number of test instruments, portability is low and long measurement time is required.

The second method of measuring soil particle size is the laser diffraction/scattering particle size analysis method. In this analytical method, the time required for measurement is short, the amount of soil required for analysis is small, and the apparatus used for analysis is small enough to be carried around. However, since the apparatus is a precision instrument, it is expensive and cannot be easily obtained by anyone.

Examples of other methods of measuring the water permeability of soil include the constant head permeability measurement, the falling head permeability measurement, and the flow pump permeability measurement, all of which are used to evaluate how much water has flowed through the soil by applying a certain amount of pressure. The apparatus used for these measurement methods is relatively small, portable, inexpensive, and relatively easy to obtain, but when applied to water-impermeable soil having a soil particle size of several micrometers, the measurement takes a very long time because water can hardly penetrate the soil.

The present invention has been made in view of these problems, and an object of the present invention is to provide a technique for quickly estimating the corrosion amount of a metal material buried in the ground with higher portability and economy.

Means for Solving the Problem

One aspect of the present invention is a corrosion amount estimation apparatus that estimates a corrosion amount of a metal material buried in the ground, the apparatus including: a soil adjustment unit configured to dry a target soil; a water permeability measurement unit configured to measure a water permeability of the soil after supplying water to the dried soil; and a corrosion estimation unit configured to estimate the corrosion amount of the metal material when buried in the soil using the water permeability.

One aspect of the present invention is a corrosion amount estimation method for estimating a corrosion amount of a metal material buried in the ground performed by a corrosion amount estimation apparatus, the method including: adjusting a target soil by drying; measuring a water permeability of the soil after supplying water to the dried soil; and estimating the corrosion amount of the metal material when buried in the soil using the water permeability.

Effects of the Invention

The present invention provides a technique that can quickly estimate the corrosion amount of a metal material buried in the ground with higher portability and economy.

DESCRIPTION OF EMBODIMENTS

Figure 1:
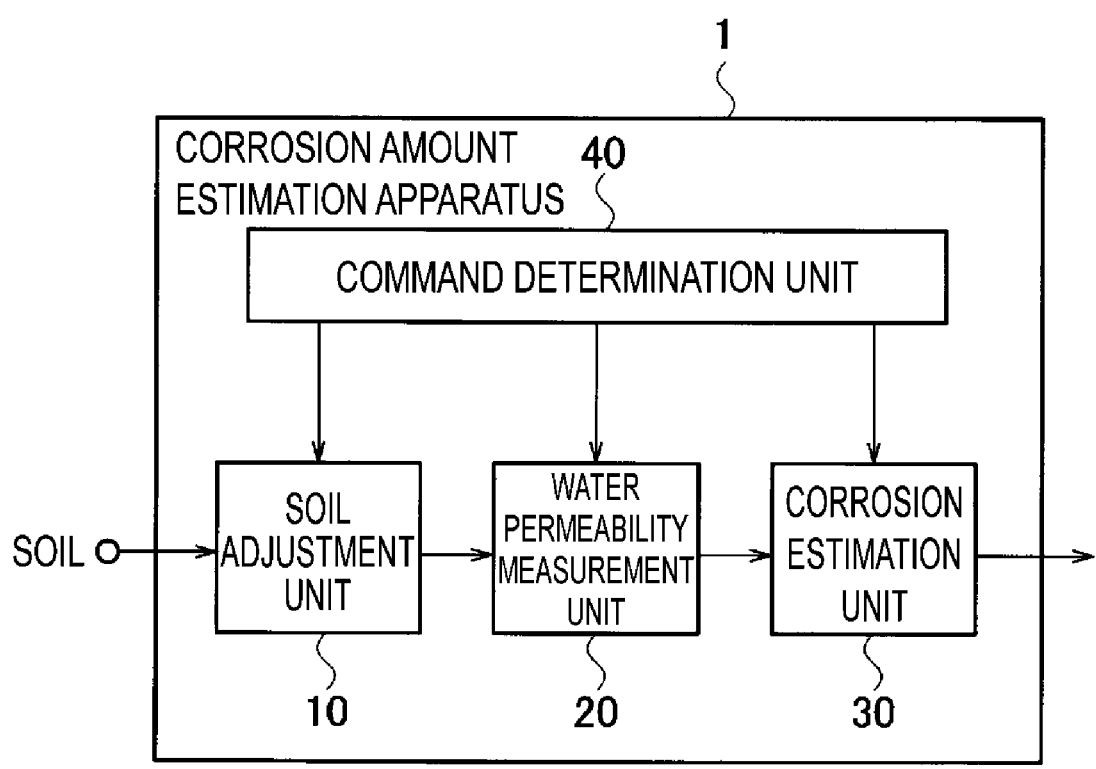
FIG. 1 is a functional block diagram schematically illustrating a configuration of a corrosion amount estimation apparatus of the present embodiment.

Soil environment is a complex environment where three phases (solid, liquid and gas) coexist. It is said that corrosion of a metal material buried in the soil progresses basically based on the reaction of the same following Formulas (1) and (2) as in the atmosphere and aqueous solution (NPL 1).

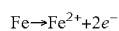
(1)

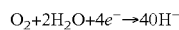
(2)

Formula (1) represents a cathodic reaction in which the member thickness of the metal material decreases as iron is ionized. Formula (2) represents an anodic reaction in which dissolved oxygen in water receives electrons and hydroxide ions are generated. These formulas indicate that water and oxygen are required on the metal surface in order for the corrosion reaction to progress.

In addition, interposition of soil particles as a solid phase is the most characteristic of soil corrosion. That is, the liquid phase and the gas phase compete with each other in the gaps between the soil particles as the solid phase, and the progress of corrosion is determined depending on how water and oxygen necessary for corrosion exist on the metal surface. The reaction field of corrosion, that is, the surface area of contact between the metal surface and water depends on the surface area of contact between the soil particles and the metal. Furthermore, how long water captured by capillary action stays in the narrow gap between the metal surface and the soil particles depends on the capillary force applied to the water, which is determined by the size of the soil particles.

In addition, oxygen in the soil is diffused as oxygen gas in the gas phase in the soil particle gaps, reaches the liquid phase, and diffuses to the metal surface as dissolved oxygen. In a porous body such as soil, diffusion of oxygen is inhibited by soil particles existing as a solid phase. Therefore, the diffusion distance of oxygen is correlated with the bending degree. The bending degree is an index representing the complexity of the diffusion path, and the diffusion path of the porous body having a small bending degree is linear as compared with the porous body having a large bending degree, and the diffusion path of the dissolved oxygen is shortened. Therefore, the bending degree changes depending on how the soil particles are clogged, and how the soil is clogged mainly depends on the soil particle size.

As described above, the soil particle size is a highly correlated environmental factor for soil corrosion as a parameter that affects both water and oxygen, which play important roles in triggering corrosion. Therefore, if the soil particle size is known, soil corrosion can be estimated.

The following two methods are widely used as the measurement of the soil particle size. The first is a soil grain size analysis method described in JIS A 1204: 2009. The grain size analysis method for soil described in JIS requires a long time to obtain results because sieve analysis and sedimentation analysis must be applied to particles of 75 μm or more and particles of less than 75 μm, respectively. The analysis requires more than 500 mL of soil sample. The main test instruments are metal mesh sieves and hydrometers as specified in JIS Z 8801-1. The metal mesh sieves used are relatively small with an inner diameter of about 200 mm and a depth of 60 mm, and the price is as low as tens of thousands of yen. However, it is necessary to prepare those having openings of 75 μm, 106 μm, 250 μm, 425 μm, 850 μm, 2 mm, 4.75 mm, 9.5 mm, 19 mm, 26.5 mm, 37.5 mm, 53 mm and 75 mm, which leads to low portability.

The second is the laser diffraction/scattering particle size analysis method. The advantage of the laser diffraction/scattering particle size analysis method is that the time required for measurement is as short as several tens of seconds, and the amount of soil collected for analysis is as small as several tens of milligrams to several grams. In the related art, the apparatus used in the present analysis has been often large, but in recent years it has become smaller, and the smallest model has a width of 300 mm, a depth of 420 mm, and a height of 400 mm, which are sizes that can be carried around. In addition, the measurement can be performed in a very short time of several 10 seconds. However, since the apparatus is a precision instrument, it is expensive at about several million yen and cannot be easily obtained by anyone.

The soil particles form a gap structure in which a liquid phase and a gas phase in the soil can exist. Soil with different soil particle sizes also have different gap structures, thus affecting the diffusion behavior and apparent diffusion rate of water or oxygen. Therefore, it is known that the behavior of water diffusing in the gaps of the soil particles, that is, the water permeability of the soil has a high correlation with the soil particle size.

Examples of the method for measuring the water permeability of soil include the constant head permeability measurement, the falling head permeability measurement, and the flow pump permeability measurement. The constant head permeability measurement is a method of calculating the water permeability coefficient K from Darcy's equation by giving a constant water level difference to the soil contained in the container and measuring the hydraulic conductivity per unit time. The above method is characterized in that the water permeability of soil can be easily measured. However, when water-impermeable soil containing fine soil particles is measured, even if a high hydraulic gradient is provided, water will not permeate through the soil and the measurement will take a long time.

The falling head permeability measurement is a method of measuring a change in a water level that decreases as water permeates the soil within a certain minute time. Even when the water-impermeable soil is applied to the above method, water does not permeate even if a high dynamic water gradient is provided, and a long time is required for measurement.

In the flow pump permeability measurement method, a minute flow rate of soil water is controlled to be constant from the outside, and a water permeability coefficient is measured by directly measuring its pressure. According to the above method, when the flow rate is about $10^{-7} CM^3/s$, a commercially available syringe can be used, so that the method can be easily performed. However, since the decomposition force in the volume measurement of the fluid is $10^{-3}$ $cm^3$, it takes a very long time to measure the water permeability of the water-impermeable soil.

In the present embodiment, water is supplied into dry soil, and the time during which the soil changes from a dry state to a wet state is observed and evaluated as the color change of the soil due to water absorption, whereby the water permeability of the soil is quickly measured at a site where a metal material is buried with high portability and at low cost. As a result, in the present embodiment, it is possible to easily estimate the corrosion amount of a metal material buried in the ground.

Embodiments of the present invention are described below with reference to the drawings. The same reference numerals are given to the same components in the plurality of drawings.

FIG. 1 is a functional block diagram schematically illustrating a configuration of a corrosion amount estimation apparatus 1 of the present embodiment. The corrosion amount estimation apparatus 1 estimates the corrosion amount of a metal material buried in the ground (soil). The corrosion amount estimation apparatus 1 illustrated in FIG. 1 includes at least one soil adjustment unit 10, at least one water permeability measurement unit 20, at least one corrosion estimation unit 30, and at least one command determination unit 40.

Figure 2:
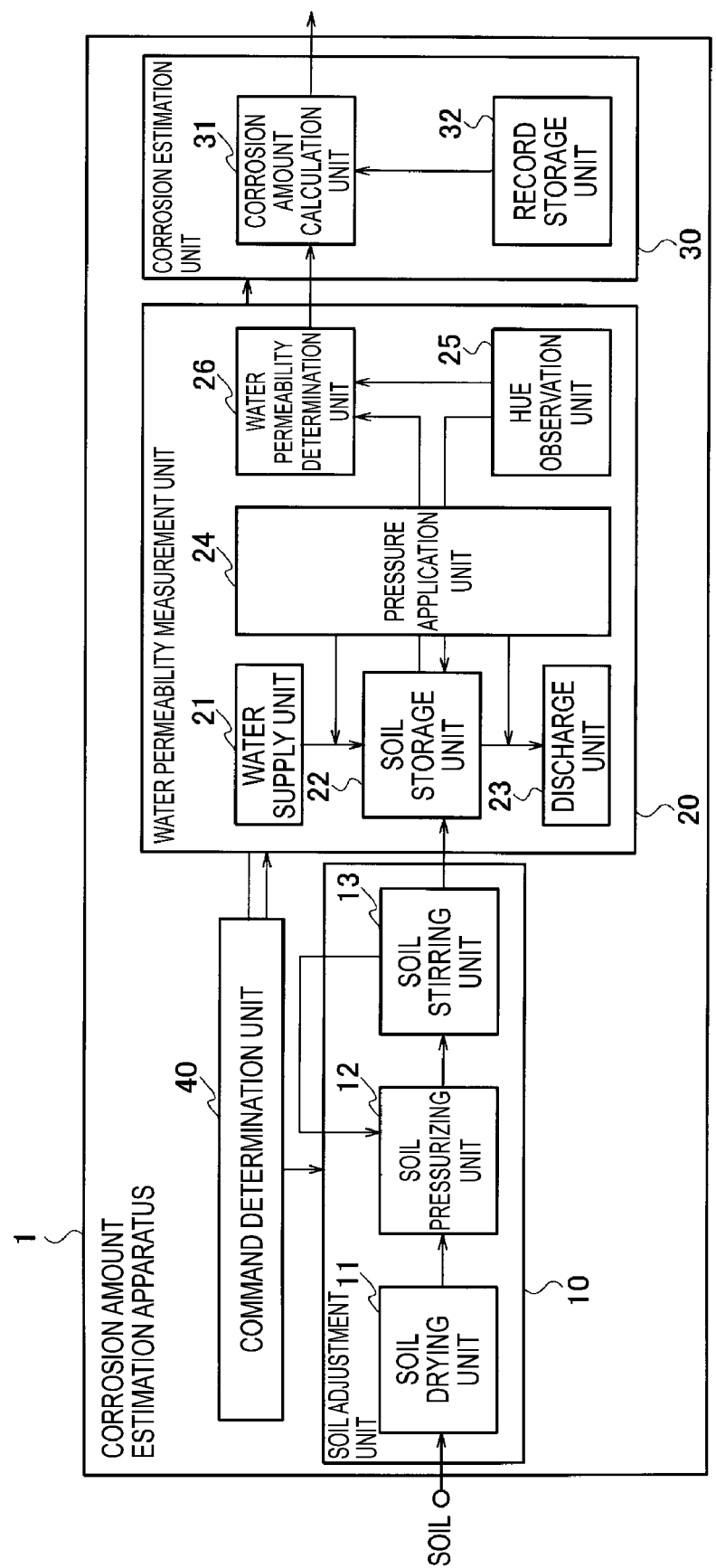
FIG. 2 is a detailed configuration example of a corrosion amount estimation apparatus illustrated in FIG. 1.

FIG. 2 is a functional block diagram schematically illustrating a detailed configuration of the corrosion amount estimation apparatus 1 of the present embodiment illustrated in FIG. 1. Before the water permeability measurement by the water permeability measurement unit 20, the soil adjustment unit 10 of the corrosion amount estimation apparatus 1 illustrated in FIG. 2 performs pretreatment such as drying target soil (recovered soil) in accordance with a command from the command determination unit 40 to adjust the soil.

The illustrated soil adjustment unit 10 includes at least one soil drying unit 11, at least one soil pressurizing unit 12, and at least one soil stirring unit 13.

The soil drying unit 11 evaporates and dries all the moisture contained in the recovered soil. Examples of the method for drying the soil in the soil drying unit 11 include exposure to a high temperature environment, standing in a dry environment using silica gel, and suction with a vacuum pump. The soil drying method is not limited to the above method as long as it can remove all moisture in the soil. However, if the soil is exposed to a high temperature environment, organic components contained in the soil may be destroyed, and the characteristics inherent in the soil may be lost. Therefore, the soil drying is preferably performed in an environment of 60° C. or lower at which the protein starts to be denatured.

The soil pressurizing unit 12 applies pressure to the soil dried by the soil drying unit 11 and crushes the lumps of the coagulated soil particles to powder. Examples of the method for the soil pressurization include pressing the soil at a constant pressure using a machine, and depressurizing the soil with a vacuum pump. The soil pressurization method is not limited to the above method as long as it can powder the lumps of soil particles. However, care must be taken because if the pressure is too high, the soil particles themselves may be crushed.

The soil stirring unit 13 stirs the soil powdered by a soil pressurizing unit 12 until it becomes uniform. In addition, the soil stirring unit 13 also has a function of loosening lumps of soil particles remaining in the soil pressurizing unit 12. The method for stirring the soil is not limited as long as it makes the powdery soil uniform. For example, the soil may be stirred by stirring two rod-shaped objects in a circular shape, or by adopting a mechanism similar to an automatic stirrer adopted in a food factory or the like. However, the material of the stirrer is preferably a rust-resistant material such as stainless steel or plastic.

The water permeability measurement unit 20 and measures the water permeability of the soil, after supplying water to the dried soil that does not contain water. In the present embodiment, the water permeability measurement unit 20 measures (evaluates), as water permeability, a change time until the color of the soil changes to the color after wetting due to water absorption by image analysis. That is, by adding water to the powdery soil dried by the soil adjustment unit 10, the water permeability measurement unit 20 measures the water permeability of the soil at a change time at which the color changes as the soil absorbs water.

Since water in the soil diffuses along the soil particle gaps, the gap structure of the soil particles is an important parameter. If the treatment by the soil adjustment unit 10 is insufficient, that is, if lumps of soil particles remain, the water permeability inherent in the soil to be measured cannot be evaluated correctly. In addition, if gaps are formed between the measuring container and the soil particles due to the lumps of soil particles, the water permeability may be overestimated as a result of water permeating through the gap. In order to ensure the reliability of the result obtained by the water permeability measurement unit 20, it is preferable to perform the process in the soil adjustment unit 10 carefully so that the process is reliably achieved.

The illustrated water permeability measurement unit 20 includes at least one water supply unit 21, at least one soil storage unit 22, at least one discharge unit 23, at least one pressure application unit 24, at least one hue observation unit 25, and at least one water permeability determination unit 26. The soil adjusted by the soil adjustment unit 10 is stored in the soil storage unit 22.

The water supply unit 21 supplies water to the dry soil stored in the soil storage unit 22 in accordance with a command from the command determination unit 40. The water supplied by the water supply unit 21 may be any water, but is preferably soil water extracted from the same type of soil as the soil to be measured for the water permeability. It should be noted that if distilled water is used, the chemical components in the soil stored in the soil storage unit 22 may flow out, and the characteristics inherent in the soil may be damaged.

The water feeding method by the water supply unit 21 is arbitrary. However, when a high pressure is applied at the time of water supply, there is a possibility that a correct result cannot be obtained because the upper surface of the dry soil is disturbed. Therefore, for example, it is preferable to adopt a method of supplying water in the form of droplets simulating rain.

In addition, the supply amount of water may be arbitrarily determined. However, since the solid phase occupies 50% of the soil and the liquid and gas phases occupy 50% of the soil, and the liquid and gas phases are competing with each other, water may be supplied so that the liquid phase occupies 100% of the soil in the liquid plus gas phase. That is, water may be supplied to the introduced soil so that the volumetric water content is 50%. Note that the water supply unit 21 also plays a role of supplying water to clean the soil attached to the soil storage unit 22 after the water permeability measurement is completed and the soil stored in the soil storage unit 22 is discharged to the outside.

The soil storage unit 22 is a container that stores the powdery dry soil adjusted by the soil adjustment unit 10. At least one side surface of the soil storage unit 22 is made of a transparent material so that a color change of the soil can be observed (photographed). The material of the soil storage unit 22 may be any material that satisfies above conditions. However, it is preferable to avoid a metal material that may corrode at the time of water permeability measurement.

The soil storage unit 22 may be a cylindrical container in accordance with the soil water permeation test method described in JIS A 1218: 2009. In accordance with JIS A 1218: 2009, the inner diameter and length of the cylinder may be 10 times or more the maximum particle size of the soil to be used. When the particle size is wide, the inner diameter and length of the cylinder may be allowed to be up to five times the maximum particle size. Alternatively, the inner diameter may be 100 mm and the length may be 120 mm in accordance with JIS A 1218: 2009.

The soil in the soil storage unit 22 for which the water permeability measurement has been completed is moved to the discharge unit 23 in accordance with a command from the command determination unit 40, and is discharged to the outside of the corrosion amount estimation apparatus 1. The discharge unit 23 may be a container adjacent to the soil storage unit 22, or may be a discharge mechanism attached to the soil storage unit 22, such as a discharge port or a discharge valve installed on an end surface of the soil storage unit 22. The shape and structure of the discharge unit 23 are not limited to those described above as long as the discharge unit 23 has a function of discharging the soil in the soil storage unit 22, for which the measurement of water permeability has been completed, to the outside of the corrosion amount estimation apparatus 1.

The pressure application unit 24 adds a predetermined pressure to the soil in the soil storage unit 22 in accordance with a command from the command determination unit 40. The pressure application unit 24 operates during storing soil in the soil storage unit 22, supplying water to the soil by the water supply unit 21, and discharging the soil by the discharge unit 23. When the dry soil adjusted by the soil adjustment unit 10 is stored in the soil storage unit 22, the pressure application unit 24 adds a predetermined pressure to the soil in the soil storage unit 22, so that the soil can be stored without any gap. However, in order to make the measurement conditions constant, it is preferable to add a similar pressure when another soil is used.

Even when the water supply unit 21 efficiently supplies water to the soil storage unit 22, the pressure application unit 24 may add a predetermined pressure to the soil in the soil storage unit 22. In addition, in order to efficiently discharge the soil to the outside of the corrosion amount estimation apparatus 1 through the discharge unit 23 after the water permeability measurement is completed, the pressure application unit 24 may reduce the pressure of the soil in the soil storage unit 22. This supports the soil discharge process.

The hue observation unit 25 images (observes) the soil stored in the soil storage unit 22 in accordance with the command from the command determination unit 40. That is, the hue observation unit 25 images a change in the color of the soil due to water absorption. The hue observation unit 25 is an imaging device that captures an image (moving image), such as a CCD camera or a CMOS camera. The hue observation unit 25 captures an image of the soil in the soil storage unit 22 from the surface of the transparent material of the soil storage unit 22, and outputs the captured image to the water permeability determination unit 26.

Figure 3:
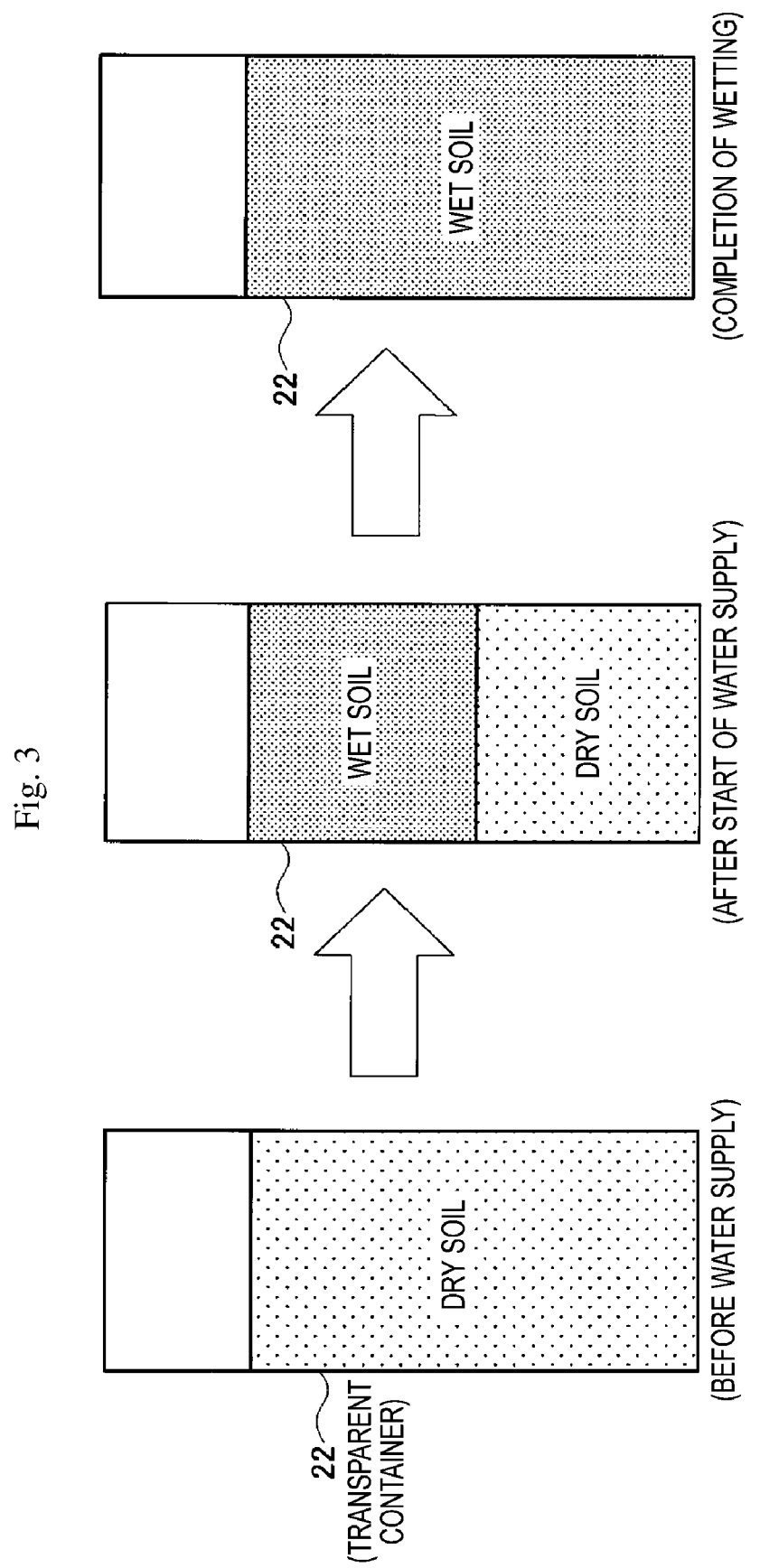
FIG. 3 is a schematic view illustrating how the color of soil changes with time as the soil gets wet.

FIG. 3 is a schematic diagram illustrating a state in which water is supplied to dry soil in the soil storage unit 22, the soil is wetted as water diffuses in the soil particle gaps, and the color of the soil changes over time. As illustrated, only dry soil is stored in the soil storage unit 22 before water supply. After the water supply is started, the soil is gradually wetted by water absorption, and the soil storage unit 22 contains dry soil and wet soil. All the soil in the soil storage unit 22 is wet soil.

When a commonly used water permeation test method is applied to water-impermeable soil, a very long time of several tens of hours is required. On the other hand, the temporal change of the color of the soil in accordance with the present embodiment as illustrated in FIG. 3 can be measured in a relatively short time of several minutes to several tens of minutes even in the water-impermeable soil. In this respect, the present embodiment is excellent.

The water permeability determination unit 26 uses the image output from the hue observation unit 25 to measure the time required for the dry soil stored in the soil storage unit 22 to completely change to the wet soil due to water absorption. Specifically, the water permeability determination unit 26 performs image analysis on the image of the soil in the soil storage unit 22 using the color (hue, color tone), measures the change time until the color of the soil changes to the color after wetting due to water absorption, and evaluates the change time as water permeability.

For example, the water permeability determination unit 26 acquires an image (RGB color image) of the dry soil stored in the soil storage unit 22 before the start of water supply from the hue observation unit 25, and stores the color of the dry soil in a storage unit (not illustrated). Then, the water permeability determination unit 26 performs image analysis on each frame of the image output from the hue observation unit 25 to acquire the time until the color of the soil in the soil storage unit 22 changes from the color of the dry soil to the color of the wet soil. Specifically, the water permeability determination unit 26 determines the point in the video output from the hue observation unit 25 when the percentage of color that has changed to the color of wet soil becomes 100% (when the color of dry soil has disappeared), and obtains the time from the start of water supply by the water supply unit 21 until the soil is completely wet.

The method is not limited to the above method as long as the change time of the soil color can be always determined under the same conditions. Instead of the image of the dry soil, the water permeability determination unit 26 may store the 406 standard soil colors in the storage unit (not illustrated) and use any one of the 406 standard soil colors as the color of the dry soil.

Instead of including the hue observation unit 25 and the water permeability determination unit 26, for example, a person may observe a color change of soil with naked eyes and measure a time from the start of water supply until all the soil in the soil storage unit 22 becomes wet soil.

The corrosion estimation unit 30 estimates the corrosion amount when the metal material is buried in the soil in the soil storage unit 22 using a change time for the soil to change from dry to wet conditions. (water permeability). In the present embodiment, the corrosion estimation unit 30 calculates the particle size of the soil using the change time and estimates the corrosion amount of the metal material based on the particle size.

The illustrated corrosion estimation unit 30 includes at least one corrosion amount calculation unit 31 and at least one record storage unit 32. The record storage unit 32 stores a calculation equation, data, and the like necessary for calculating a water permeability coefficient from the change time measured by the water permeability measurement unit 20, a soil particle size from the water permeability coefficient, and a corrosion amount from the soil particle size. The corrosion amount calculation unit 31 estimates the corrosion amount from the change time in the water permeability measurement unit 20 using various calculation equations and data stored in the record storage unit 32.

As a method of estimating the corrosion amount, for example, the corrosion amount calculation unit 31 may obtain the relationship between the change time by the water permeability measurement unit 20 and the water permeability coefficient in advance using a calibration curve or the like and store the relationship in the record storage unit 32, and acquire the water permeability coefficient k from the relationship. The water permeability in the soil is closely related to the ease of flow of water in the soil particle gaps, and an index indicating the ease of flow of water is the water permeability coefficient k.

Then, the corrosion amount calculation unit 31 calculates the particle size by using, for example, Hazen's equation (Equation (3)) or Creager's equation (Equation (4)) which is well known as a relationship between the water permeability coefficient k and the particle size:

Math. 1

$$k = 100 d_e^2 \quad (3)$$

$$k = 0.359 d_{20}^{2.327} \quad (4)$$

Wherein k is a water permeability coefficient, $d_e$ is an average particle size, and $d_{20}$ is a 20% particle size. With respect to the 20% particle size, a cumulative distribution curve (vertical axis: frequency, horizontal axis: particle size) can be obtained by performing particle size distribution measurement. The particle size when the frequency on the vertical axis is 20% corresponds to the 20% particle size.

Alternatively, for example, the relationship between the soil particle size and the corrosion rate obtained in advance is stored in the record storage unit 32, and the corrosion amount calculation unit 31 acquires the corrosion rate corresponding to the particle size calculated using the relationship.

As a method for calculating corrosion rate electrochemically, a method of measuring reaction resistance (charge transfer resistance $R_{ct}$) accompanying the progress of corrosion is generally used. As the electrochemical method, for example, a DC polarization resistance method or an AC impedance method may be used.

In the measurement in the direct current polarization resistance method, the direct current potential is swept in a potential range in which the metal surface is not roughened based on the natural potential and the resistance value can be calculated from the obtained current-potential characteristics. For example, the measurement may be performed at ±5 [mV], which is an applied potential in an AC impedance method considered to have a small influence on the metal surface in electrochemical measurement. The charge transfer resistance $R_{ct}$ is calculated from the obtained gradient of the current-potential characteristic. The gradient may be calculated by, for example, a least squares method or an extrapolation method.

The measurement by the AC impedance method is carried out from high frequency to low frequency, and arcs appear in each of the high frequency region and the low frequency region. Since the charge transfer resistance $R_{ct}$ is considered to be derived from the arc in the low frequency region, the charge transfer resistance $R_{ct}$ is calculated from the value of the horizontal axis (Impedance real part, Z' [Ω·cm²]) from the start point to the end point of the arc in the low frequency region. The AC application potential is preferably ±5 [mV], which is considered to have a small effect on the metal surface.

Note that, since the resistance value of the entire measurement system is calculated for the charge transfer resistance $R_{ct}$ obtained by the direct current polarization resistance method, there is a possibility that the value of the soil resistance appears to be too large to be ignored with respect to the charge transfer resistance $R_{ct}$ in the measurement in the soil sample. On the other hand, in the AC impedance method, the resistance value measured by the frequency of the applied potential can be separated, and the arc in the low frequency region reflects only the charge transfer resistance $R_{ct}$, so that only the charge transfer resistance $R_{ct}$ can be accurately obtained. Therefore, it is preferable to perform electrochemical measurement in advance using the AC impedance method.

From the charge transfer resistance $R_{ct}$ measured by such a method, the corrosion current density $i_{corr}$ is calculated based on Equation (5):

Math. 2
$$i_{corr} = K \cdot \frac{1}{R_{ct}} \quad (5)$$

wherein $i_{corr}$ is a corrosion current density, K is a conversion coefficient, and $R_{ct}$ is charge transfer resistance. Here, the conversion coefficient K is obtained in advance. The conversion coefficient K may be calculated based on Equation (6) by deriving a Tafel gradient from the anodic and cathodic polarization curves:

Math. 3
$$K = \frac{\beta_a \cdot \beta_c}{2.3(\beta_a + \beta_c)} \quad (6)$$

wherein $\beta_a$ is the anode gradient, and $\beta_c$ is the cathode gradient. Alternatively, the conversion coefficient K may be calculated on the assumption that $\beta_a=\beta_c=0.1$ without performing the Terfel gradient measurement.

The corrosion rate r is derived based on Equation (7): wherein r is a corrosion rate, z is an ionic valence, $\rho$ is a density, F is a Faraday constant, and M is an atomic weight.

Math. 4
$$r = \frac{M}{z\rho F} \cdot i_{corr} \quad (7)$$

The record storage unit 32 stores the corrosion rate electrochemically calculated as described above for each particle size of the soil, and the corrosion amount calculation unit 31 may acquire the corrosion rate corresponding to the particle size obtained from the change time measured by the water permeability measurement unit 20 with reference to the record storage unit 32.

Then, the corrosion amount calculation unit 31 calculates the corrosion amount using the power law (Equation (8)) that should be known as an empirical model for predicting the progress of corrosion using the acquired corrosion rate r.

Math. 5
$$d = rt^n \quad (8)$$

Here, d is the corrosion amount, t is the aged value of the buried metal material, and n is the evaluation value of the corrosiveness of the metal material. However, since the value of n is empirically said to be from 0.4 to 0.6, an intermediate value of 0.5 may be adopted.

Figure 4:
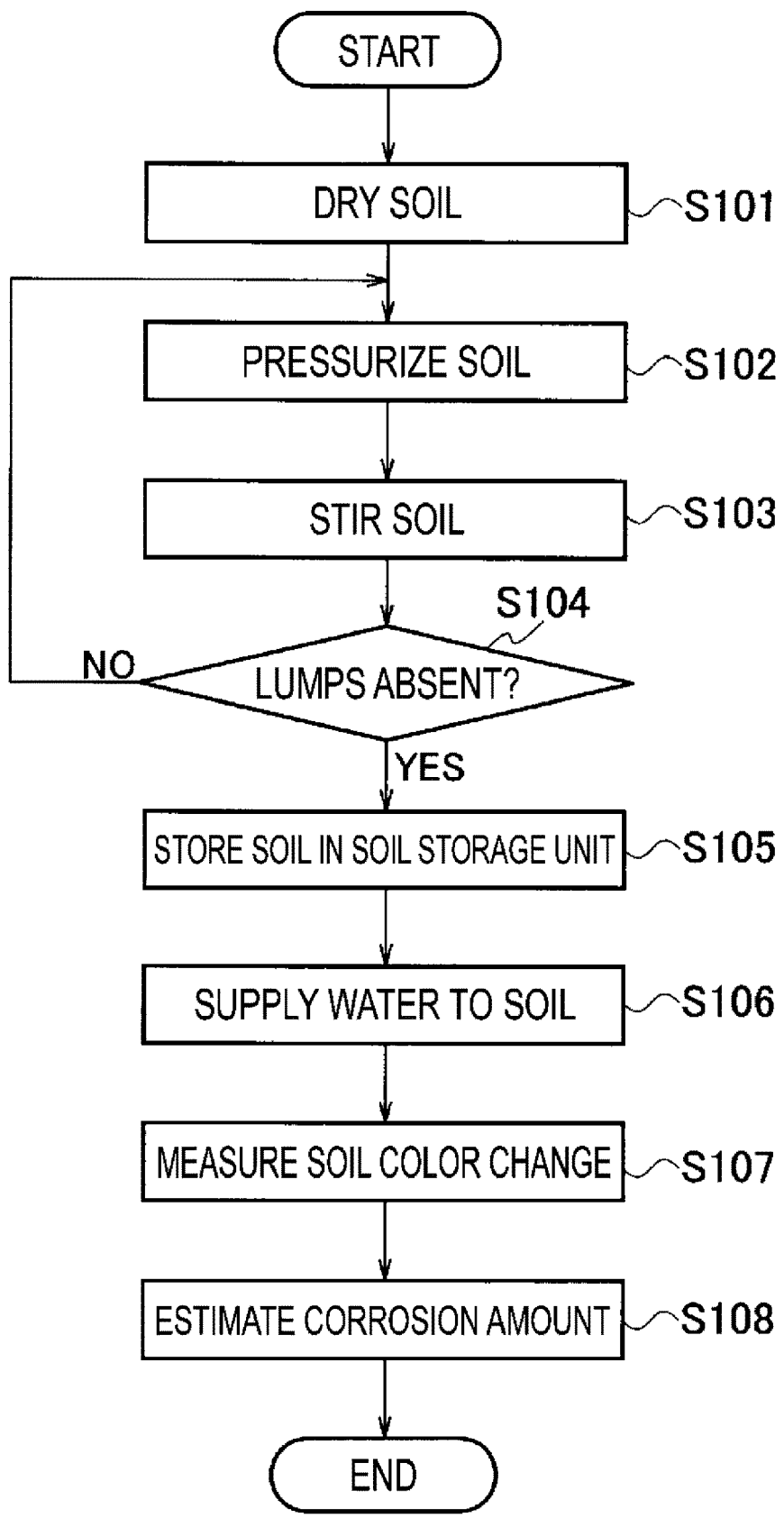
FIG. 4 is an operation flowchart illustrating a processing procedure of the corrosion amount estimation apparatus.

FIG. 4 is an operation flowchart illustrating a processing procedure of the corrosion amount estimation apparatus 1 of the present embodiment. First, the command determination unit 40 receives the command of the user and supplies the soil to the soil adjustment unit 10. The soil drying unit 11 dries the supplied soil (step S101). The soil pressurizing unit 12 applies pressure to the dried soil, and crushes the lumps of lumped soil particles (step S102).

The soil stirring unit 13 stirs the pressurized soil (step S103). The command determination unit 40 determines whether lumps of soil particles remain in the soil after the stirring (step S104). When lumps are generated in the soil, the volume as the soil is relatively large. On the other hand, in a state where the lumps in the soil are finely crushed, the small particles increase and the volume of the soil decreases. Therefore, the command determination unit 40 may determine whether lumps of soil particles remain using the volume of the soil or the line (height) of the soil surface of the container that stores the soil in the soil adjustment unit 10.

Specifically, the command determination unit 40 may measure the volume of the soil every time after the stirring in step S103, and determine that the lumps of the soil particles do not remain in the soil after the stirring when there is no change between the volume measured in the previous step S103 and the volume measured this time (when the volume is not reduced). In addition, the command determination unit 40 measures the line of the soil surface of the container containing the soil every time after the stirring in step S103, and when there is no change between the line measured in the previous step S103 and the line measured this time (when the height of the soil surface is not lowered), it is determined that a lump of soil particles does not remain in the soil after the stirring.

In accordance with a determination that lumps remain (step S104: NO), the command determination unit 40 transfers the soil to the soil pressurizing unit 12, and causes the soil pressurizing unit 12 and the soil stirring unit 13 to execute steps S102 and S103 again.

In accordance with a determination that lumps are absent (step S104: YES), the command determination unit 40 stores the stirred dry soil in the soil storage unit 22 of the water permeability measurement unit 20 (step S105). The water supply unit 21 supplies water to the soil in the soil storage unit 22 according to the command of the command determination unit 40 (step S106).

The hue observation unit 25 photographs the soil from the direction of the transparent member of the soil storage unit 22 according to the command of the command determination unit 40, and measures the change time until the soil is wetted by the supply of water and the color of the soil completely changes (step S107). The corrosion estimation unit 30 estimates the corrosion amount when the metal material is buried in the soil based on the change time (step S108).

The corrosion amount estimation apparatus 1 of the present embodiment described above includes the soil adjustment unit 10 that dries target soil, the water permeability measurement unit 20 that measures the water permeability of the soil after suppling water to the dried soil, and the corrosion estimation unit 30 that estimates the corrosion amount when the metal material is buried in the soil using the water permeability.

As described above, in the present embodiment, water is supplied into dry soil, and the water permeability of the soil is measured. Specifically, in the present embodiment, the change time required for the soil to change from the dry state to the wet state (water permeability) is observed and evaluated by using the color change of the soil due to water absorption, and the corrosion amount of a metal material is estimated from the change time.

As a result, in the present embodiment, the water permeability of the soil can be measured at a site where the metal material is buried, with high portability, at low cost, and in a short time. Therefore, in the present embodiment, it is possible to easily estimate the corrosion amount of the metal material buried in the ground.

Figure 5:
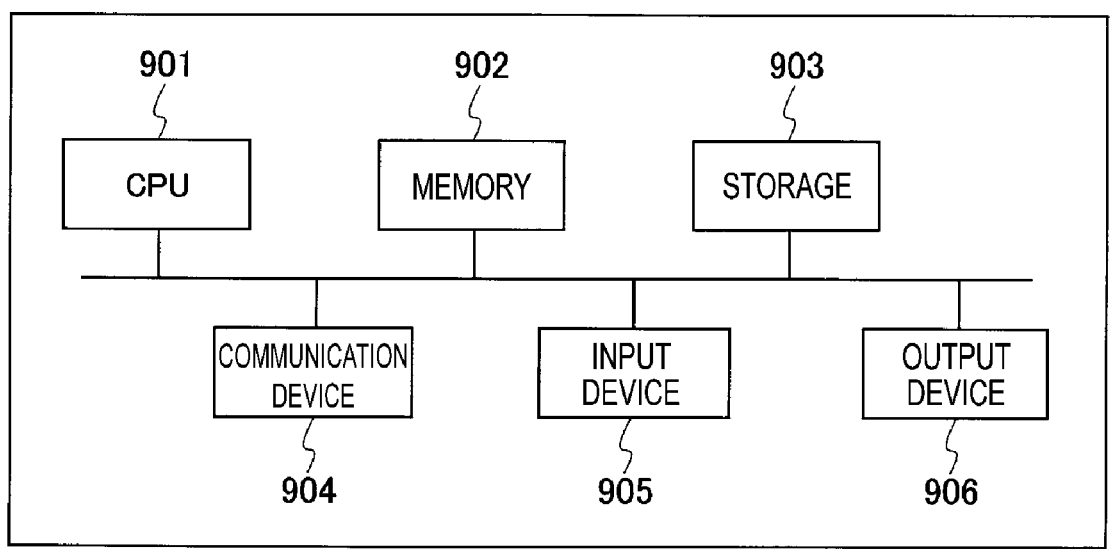
FIG. 5 illustrates a hardware configuration.

The command determination unit 40 and the corrosion estimation unit 30 of the corrosion amount estimation apparatus 1 described above may use, for example, a general-purpose computer system as illustrated in FIG. 5. The illustrated computer system includes a central processing unit (CPU, processor) 901, a memory 902, a storage 903 (hard disk drive: HDD, solid state drive: SSD), a communication device 904, an input device 905, and an output device 906. The memory 902 and the storage 903 are storage apparatuses. In this computer system, the CPU 901 executes the programs for the command determination unit 40 and the corrosion estimation unit 30 loaded on the memory 902, thereby implementing the functions of the command determination unit 40 and the corrosion estimation unit 30.

In addition, the command determination unit 40 and the corrosion estimation unit 30 may be implemented by one computer or may be implemented by a plurality of computers. The command determination unit 40 and the corrosion estimation unit 30 may be virtual machines mounted on a computer.

The programs for the command determination unit 40 and the corrosion estimation unit 30 can be stored in a computer-readable recording medium such as an HDD, an SSD, a universal serial bus (USB) memory, a compact disc (CD), or a digital versatile disc (DVD), or can be distributed via a network.

The present invention is not limited to the above-described embodiments and modifications, and various modifications may be made within the scope of the gist of the present invention.

REFERENCE SIGNS LIST

Corrosion amount estimation apparatus
10: Soil adjustment unit
11: Soil drying unit
12: Soil pressurizing unit
13: Soil stirring unit
20: Water permeability measurement unit
21: Water supply unit
22 Soil storage unit
23: Discharge unit
24: Pressure application unit
25: Hue observation unit
26: Water permeability determination unit
30: Corrosion estimation unit
31: Corrosion amount calculation unit
32: Record storage unit
40: Command determination unit

The invention claimed is:

1. A corrosion amount estimation apparatus that estimates a corrosion amount of a metal material buried in the ground, the apparatus comprising:
a soil adjustment unit that configured to dry a target soil;
a water permeability measurement unit configured to measure a water permeability of the soil after supplying water to the dried soil; and
a corrosion estimation unit configured to estimate the corrosion amount of the metal material when buried in the soil using the water permeability, wherein
the water permeability measurement unit measures a change time until a color of the soil completely changes to a color after wetting due to water absorption as the water permeability by image analysis, and
the corrosion estimation unit calculates a particle size of the soil using the change time, and estimates the corrosion amount of the metal material based on the particle size.

2. The corrosion amount estimation apparatus according to claim 1, wherein the water permeability measurement unit measuring the change time required for the color of the soil to completely change to the color after wetting comprises:
acquiring images of the soil as the water is supplied to the soil;
performing image analysis of the images; and
measuring a time that the image analysis shows that the color of the soil has completely changed to the color after wetting.

3. The corrosion amount estimation apparatus according to claim 1, wherein corrosion estimation unit estimates the corrosion amount of the metal material when buried in the soil using the water permeability by applying a Direct Current (DC) polarization resistance method or an Alternating Current (AC) impedence method.

4. A corrosion amount estimation method for estimating a corrosion amount of a metal material buried in the ground performed by a corrosion amount estimation apparatus, the method comprising:
adjusting a target soil by drying;
measuring a water permeability of the soil after supplying water to the dried soil; and
estimating the corrosion amount of the metal material when buried in the soil using the water permeability, wherein
the measuring includes measuring a change time required for a color of the soil to completely change to a color after wetting due to water absorption as the water permeability by image analysis, and
the estimating includes calculating a particle size of the soil using the change time, and estimating the corrosion amount of the metal material based on the particle size.

5. The corrosion amount estimationg method according to claim 4, wherein measuring the change time required for the color of the soil to completely change to the color after wetting comprises:
acquiring images of the soil as the water is supplied to the soil;
performing image analysis of the images; and
measuring a time that the image analysis shows that the color of the soil has completely changed to the color after wetting.

6. The corrosion amount estimation method according to claim 4, wherein estimating the corrosion amount of the metal material when buried in the soil using the water permeability comprises applying a Direct Current (DC) polarization resistance method or an Alternating Current (AC) impedence method.

* * * * *